US005674948A

United States Patent [19]

Vonk

[11] Patent Number: 5,674,948

[45] Date of Patent: Oct. 7, 1997

[54] COLORED POLYMER COMPOSITION

[75] Inventor: Gerardus P. T. Vonk, Echt, Netherlands

[73] Assignee: DSM N.V., Netherlands

[21] Appl. No.: 377,006

[22] Filed: Jan. 23, 1995

[30] Foreign Application Priority Data

Jan. 21, 1994 [BE] Belgium .............................. 09400068

[51] Int. Cl.[6] .......................... C08F 20/56; C08F 120/56; C08F 220/56

[52] U.S. Cl. .................................... 525/329.4; 526/307.2; 526/307.4; 528/486; 528/491; 528/492; 524/80

[58] Field of Search .................................... 528/486, 491, 528/492; 524/430, 80; 525/329.4; 526/307.2, 307.4

[56] References Cited

U.S. PATENT DOCUMENTS

| | | | |
|---|---|---|---|
| 3,281,260 | 10/1966 | Ucci . | |
| 3,380,798 | 4/1968 | Ucci . | |
| 3,402,014 | 9/1968 | Ucci . | |
| 3,819,555 | 6/1974 | Kaufman | 526/307.4 |
| 4,623,602 | 11/1986 | Bakker et al. | 430/106 |
| 5,030,697 | 7/1991 | Hugl | 525/329.4 |
| 5,227,421 | 7/1993 | Kageyama et al. . | |
| 5,470,918 | 11/1995 | Tsutumi | 525/329.4 |

FOREIGN PATENT DOCUMENTS

| | | |
|---|---|---|
| A1050501 | 4/1982 | European Pat. Off. . |
| A2459634 | 12/1991 | European Pat. Off. . |
| 1037175 | 7/1966 | United Kingdom . |

*Primary Examiner*—Paul R. Michl
*Assistant Examiner*—U. K. Rajguru
*Attorney, Agent, or Firm*—Cushman Darby & Cushman IP Group of Pillsbury Madison & Sutro, LLP

[57] ABSTRACT

The invention relates to a colored polymer composition with strongly improved color properties. This improvement is achieved by masking groups in the polymer that are reactive with respect to the colorant with the aid of an effective quantity of a compound suitable for this purpose.

The invention is particularly suitable for polyamides, the amino end group content being reduced to less than 20, preferably less than 5 meq/kg, with the aid of acetyl lactam. The thermostability of e.g. CI Pigment Red 209 colored nylon-6 is improved by a factor of 9. The brightness of the color also increases to a surprising extent.

16 Claims, No Drawings

COLORED POLYMER COMPOSITION

The invention relates to a coloured polymer composition, more in particular a coloured polymer composition based on one or more organic dyes and/or pigments, hereinafter referred to as colorants.

Especially in cases where it is desired to avoid the use of (heavy) metals, for example lead and cadmium, organic compounds are to be preferred. However, a serious drawback of organic colorants is that they are generally less colourfast and their colour is often less brilliant. Especially in thermoplastic polymers with a high processing temperature these drawbacks are prominent. For polyamides in particular, only a limited number of organic dyes and pigments are suitable.

In this application organic dyes are understood to be colour-imparting organic compounds which are completely soluble in the polymer under the conditions of use. Pigments are insoluble and consist of particles dispersed in the polymeric matrix by physical means.

Dyes are further classified into water-soluble and polymer-soluble materials. For the latter class the term solvent-soluble is sometimes used, but because of its confusing character it will not be used in this application. Polymer-soluble dyes are only sparingly soluble in water.

Water-soluble dyes are mainly used for the colouring of fibres and in (printing) inks, among other things. The water-soluble dyes are sorbed from the aqueous solution by the substrate polymer through physical or chemical interaction. Binding forces include hydrogen bridges, $\pi$-type bonds and Van de Waals forces. If ionogenic groups are present interaction occurs via ion exchange. This is the case, for example, in the dyeing of acrylic and polyamide fibres using acid dyes. The content of free amino groups in the polyamide determines the amount of dye that can be bound, i.e. the colour intensity, and the dyeing speed. However, the effect of the end groups on the dyeability of textile fibres by water-insoluble dyes, the so-called disperse systems, is negligible. For a discussion of the principles and methods see e.g. The Theory of Coloration of Textiles, The Dyers Company Publications Trust, p. 146 ff.

Polymers are coloured by the physical admixing of colorants, solubility and dispersibility being important parameters. The requirements to be met by polymer-soluble and water-soluble dyes further differ in that the polymer-soluble dyes must be capable of withstanding very high temperatures during mixing with the melt and during processing of the polymer via e.g. injection moulding. The same goes for the application of pigments.

Given the high temperature stability required, only a limited number of colorants are suitable for use in polymer compositions which need to be processed via the melt or in thermosetting resins curing at elevated temperatures. This constraint is even stronger in the case of colorants for polymers with a reducing and/or alkaline character, such as polyamides and copolymers with polyamide segments.

Another limiting factor with regard to polymers coloured with organic colorants is the fact that the colour is often less brilliant. This limitation is felt to be especially strong with polymers for which, due to their reactivity at high temperatures, the choice of dyes and/or pigments is limited.

The object of the invention is a coloured polymer composition with a good colourfastness and high brilliancy.

Other objects are the process for preparing such a polymer composition and a moulded object obtained by melt processing of the polymer composition.

The polymer composition coloured with organic colorants according to the invention is characterized in that the polymer composition comprises an effective quantity of a compound which masks groups in the polymer that are reactive with respect to the colorant by reacting with them.

In principle, any polymer can serve as polymer matrix for the composition; the invention is particularly effective if the matrix polymer contains reductive and/or alkaline groups. The reason for this is that the quality of the colour of most dyes and/or pigments is negatively affected if these groups are present at a high temperature, e.g. colorants based on azo compounds, anthraquinone, xanthene, e.g. Rhodamine B, azine compounds, e.g. nigrosine, perinone and quinoline and pigments based on mono- and disazo compounds, quinacridone, dioxazine, anthraquinone, perylene, thioindigo and chloroisoindoline are sensitive to these groups.

For a comprehensive description of organic pigments and dyes and their application in polymer compositions the reader is referred to e.g. the Encyclopedia of Polymer Science and Technology, (1985), Vol. 3. pp. 746–758 and literature references mentioned therein.

Examples of polymers with alkaline and/or reducing groups or polymers in which these groups may be formed upon heating are polyamides, copolymers of polyamides, for example polyether ester amides, polyesters and copolyesters, phenolic resins curing at high temperatures and polyhydroxyacrylates.

However, the invention is not limited to polymers with alkaline and/or reducing groups, the invention is effective for all polymer compositions that contain groups, possibly as impurities, for example catalyst residues, or as additive, for example UV stabilizer, which can have an adverse effect on the colour by reacting with the dye and/or the pigment.

Alkaline groups in polymers are for example amino groups and metal-neutralized groups in ionomers, for example in polyethylene methacrylate. Groups having a reducing capacity are for example amino groups, aldehyde groups and thiol groups. Hydroxyl groups in polyesters can form aldehyde upon heating.

Alkaline groups can in principle be masked by electrophilic groups such as acids and epoxides, preferably monoepoxides. The high-boiling acids, for example benzoic acid, acid anhydrides, e.g. phthalic anhydride, acid chlorides and chlorine-substituted triazine derivatives, for example 2,4-diphenyl 6-chlorotriazine, are eligible. Compounds which mask the reactive group via a non-equilibrium reaction are particularly effective. Amino groups are preferably masked with compounds chosen from the group comprising N-acyl lactams, for example N-acetyl caprolactam, N,N'-adipoyldicaprolactam, N,N'-terephthaloyldicaprolactam, N,N-isophthaloyldicaprolactam and mixtures thereof. Lactones, e.g. $\gamma$-butyrolactone, can also react with the amino end groups in polyamides. However, the effect of this on the colour stability is limited because the decrease in free amino endgroup content is apparently not sufficiently large. Experiments have revealed among other things that the presence of 2% $\gamma$-butyrolactone in a polyamide-6 with about 45 meq $NH_2$/kg led to a reduction in amino end group content to 20 meq $NH_2$/kg.

Although a reduction of the content of free reactive groups to less than 20 meq/kg of polyamide has some effect, the content of free reactive groups should preferably be reduced to less than 10 meq/kg, more preferably to less than 5 meq/kg.

To achieve this, the polymer composition preferably contains the compound masking reactive groups in a molar ratio of at least 1:1 referred to the reactive groups. More preferably, this ratio should be at least 1.35:1. For compounds whose masking capacity is weaker, for example $\gamma$-butyrolactone, this ratio should preferably be at least 5:1.

The process of the invention for obtaining the coloured polymer composition is characterized in that the compound which masks reactive groups in the polymer by reacting with the colorant is added to the polymer before or during mixing-in of the colorant.

The reactive compound is preferably added before the colorant comes into contact with the polymer in the melt. Addition may take place during polymerization, for example; in general this will be at the end of the polymerization of the matrix polymer. The compound may also be applied to the polymer granules, which are subsequently molten in an extruder or another melting device, for example a Banbury mixer, upon which the colorant is added, possibly in a masterbatch if so desired. Obviously, the polymer, the compound and the colorant can be premixed in the solid state and subsequently simultaneously added to the extruder or the melting device. Clearly, a person skilled in the art will be able to choose the most desirable embodiment depending on the conditions and the available equipment.

In the case of thermosetting resins the compound and the colorant are added before the first curing step, the compound is preferably added to the most reactive component and the colorant to the least reactive component, before (pre) polymerization is started, or to the prepolymerization reaction mixture as long as this can readily be mixed.

In addition, the polymer composition according to the invention may contain the usual additives, for example fillers, reinforcing fibre materials such as glass fibres, UV stabilizers, flame retardants, softeners and mould release agents, and other polymers which do not contain reactive groups may also be present.

The invention will now be elucidated with reference to a number of examples without being limited thereto.

The coloured samples produced in these examples and comparative examples are tested for colour quality by measuring the CIELab values (CIE=Commission Internationale d'Eclairage). This involves the determination of so-called tristimulus values from the spectral composition of the luminous source, the reflectance values of the coloured object and the response of the light-sensitive cones in the retina, which values are subsequently converted to CIELab values.

A comprehensive description of this colour measurement method can be found in, for example, Judd and Wyszecki, Color in Business, Science and Industry, John Wiley and Sons, ISBN 0/471/45212-2 and Billmeyer and Saltzman, Principles of Color Technology, Interscience Publishers, New York/London/Sydney, Libr. of Congress Card Nr.: 66-20386.

The value of L* is a measure of the brightness of the colour. $0 \leq L^* \leq 100$, 0=black, 100=white; a* and b* indicate the position on the red/green and the yellow/blue axis, respectively. A higher absolute value on the a*- or b*-axis indicates a higher degree of saturation. The colour fastness was determined by injection moulding the various compositions after residence times of 4 and 10 minutes in the melt. The colour difference $\Delta E^*_{ab}$ is a measure of the stability of the colour. $\Delta E^*_{ab}$ is calculated from the change in L*, a* and b* over the period between 4 and 10 minutes according to $\Delta E^*_{ab}=((\Delta L^*)^2+(\Delta a^*)^2+(\Delta b^*)^2)^{1/2}$. Higher values of $\Delta E^*_{ab}$ indicate a lower thermal stability of the colour.

The amino end group content of the polyamide compositions was determined by potentiometric titration in phenol at 80° C.

The colorants used in the examples were limited to red and yellow colorants to enable a better comparison of the effects on colour for the compositions of the invention. It will be obvious to one skilled in the art that other colorants that provide other colours, for example anthraquinone-based blue and green dyes such as Solvent Blue 56 and Solvent Green 3, or vat pigments such as Isoviolanthrone Violet (PV31), can be included in the compositions of the invention.

The invention is demonstrated in the examples with reference to a number of polyamides, because these polymers generally yield the least stable coloured compositions due to the presence of the amino end groups, which have both alkaline and reducing properties. However, it will be clear to one skilled in the art that the invention is not limited to compositions comprising polyamides, but is in principle effective for all polymer compositions containing reducing or alkaline groups. These groups can be present in the polymer molecule, for example —OH end groups in polyesters, as well as in catalysts, UV stabilizers or other additives or impurities in the polymer.

Materials:

Polyamide 6, $NH_2$-groups: c. 50 meq per kg

Polyamide 66, $NH_2$-groups: c. 45 meq per kg

Polyamide 46, $NH_2$-groups: c. 25 meq per kg

Dyes and pigments are characterized by the Colour Index Number (C.I. Nr)

C.I. Pigment yellow 147, Const. Nr.: 60645, anthraquinone

C.I. Pigment Red 242, Const. Nr.: 20067, disazo-condensation product

C.I. Solvent yellow 163, Const. Nr.: 58840, anthraquinone

C.I. Pigment Red 149, Const. Nr.: 71137, perylene

C.I. Pigment Red 178, Const. Nr.: 71155, perylene

C.I. Pigment Red 209, Const. Nr.: 73905, quinacridone

EXAMPLES AND COMPARATIVE EXPERIMENTS

Example I and Comparative Experiment A 0.5 wt. % $TiO_2$ and 0.2 wt. % C.I. Pigment Yellow 147 are applied to the surface of polyamide 6 granules by tumbling for 30 minutes at room temperature, followed by extrusion at 260° C. From this extrudate plaques are injection moulded at 280° C. and their colour is evaluated. The experiment is repeated, except that the polyamide-6 is first tumbled with 0.9 wt. % N-acetylcaprolactam for 30 minutes at room temperature and extruded at 260° C., after which the pigment is applied.

The amino end group content of the polyamide is determined before and after treatment with the N-acetylcaprolactam (ACL).

The results of the measurements are listed in Table 1.

TABLE 1

| Polymer | amino end group content meq/kg | compound | L* | a* | b* | |
|---|---|---|---|---|---|---|
| PA-6 | 50 | — | 67.1 | 1.6 | 42.7 | Comp. Exp. A |
| | 6 | ACL | 81.5 | 10.0 | 63.2 | Example I |

A significant improvement in both brightness and colour saturation is achieved.

Example II

Example I was repeated, except that this time Solvent Yellow 163 (0.2 gew. %) was used as dye. Solvent yellow is a dye that is readily applicable in polyester but is not recommended for polyamides.

Colour test plaques of the N-acetyl lactam containing composition and the composition without N-acetyl lactam (reference) showed the following CIELab values, respectively:

L*=81.4, a*=18.6 and b*=69.3 and

L*=69.4, a*=27.6 and b*=54.0.

Example III

Example II is repeated, but instead of N-acetyl caprolactam 0.9 wt. % phthalic anhydride is used. The content of free amino end groups decreases to 4 meq per kg.

The CIELab values measured on plaques injection moulded at 280° C. are as follows:

L*=80.1, a*=19.2 and b*=69.6

Example IV

Polyamide 66 with 45 meq amino end groups per kg is tumbled with 0.9 wt. % N-acetyl caprolactam and subsequently extruded at 260° C. The content of amino end groups is then 3 meq per kg.

The granules obtained after extrusion are tumbled with 0.5 wt. % $TiO_2$, 0.2 wt. % C.I. Pigment Red 149 and extruded at 260° C.

From this extrudate colour test plaques are injection moulded at 290° C. The CIELab values of these are L*=48.9 a*=40.1 and b*=16.4

For the non-modified material, comparative experiment C, the CIELab values are L*=47.4 a*=30.2 and b*=12.9

C.I. Pigment Red 149 is a perylene pigment, which is generally recommended for vinyl polymers, polyethylene, polypropylene and cellulose polymers.

Example V

Polyamide 4,6, with 25 meq amino end groups per kg, is tumbled with 0.9 wt. % N-acetylcaprolactam, (30 min at room temperature) and subsequently extruded at 290° C. The amino end group content is then 5 meq/kg. The polymer granules thus obtained are tumbled with 0.5 wt. % $TiO_2$ and 0.2 wt. % C.I. Solvent Yellow 163 and extruded at 290° C.

Of this composition colour test plaques were injection moulded at a set temperature of 300° C., the residence times in the injection mould being 4 and 10 minutes. ΔE* for the composition with N-acetyl lactam is 2.4, for the reference composition in which no N-acetyl lactam is present $\Delta E^*_{ab}$ is 5.2.

It is highly surprising that in spite of the very high processing temperature this dye, which is not recommended for polyamide, nevertheless shows a high colour fastness in the composition according to the invention.

Example VI

Example I was repeated, but this time C.I. Pigment Red 209 was used as colorant. The CIELab values were L*=51.2, a*=45.9 and b*=28.7. The thermostability ΔE* is 0.9, in contrast with ΔE*= approx. 8 for a reference sample with untreated polyamide.

I claim:

1. Coloured polymer composition comprising a polyamide or a copolymer containing polyamide groups and one or more organic colorants, characterized in that the composition additionally comprises an effective quantity of a compound that masks groups in the polyamide composition that are reactive with respect to the colorant by reacting with said groups.

2. Polymer composition according to claim 1, characterized in that the molar ratio of compound:colorant-reactive groups is at least 1.

3. Polymer composition according to claim 2, characterized in that the molar ratio of compound:colorant-reactive groups is at least 1.35.

4. Polymer composition according to claim 3, characterized in that the molar ratio of compound:colorant-reactive groups is at least 5.

5. Process for improving the colourfastness of polymer compositions containing polyamide and colored with organic colorants, characterized in that an effective quantity of a compound which masks groups in the polyamide composition that are reactive with respect to the colorant by reacting with these groups is admixed.

6. Process according to claim 5, characterized in that the compound is chosen from the group consisting of lactones, non-volatile acids, acid anhydrides, acid chlorides, epoxides, chlorine-substituted triazines and acyl lactams.

7. Process according to claim 5, characterized in that the effective quantity of the compound to be admixed is chosen so that the content of colorant reactive groups in the polyamide composition is less than 20 meq/kg after admixture.

8. Process according to claim 7, characterized in that the effective quantity of the compound to be admixed is chosen so that the content of colorant reactive groups in the polyamide composition is less than 5 meq/kg after admixture.

9. Process according to claim 5, characterized in that the compound is admixed with the polymer before the organic colorant.

10. Object moulded from the polymer composition using the process according to claim 5.

11. Polymer composition according to claim 1, characterized in that the compound is chosen from the group consisting of high-boiling acids, acids anhydrides, lactones, chlorine substituted triazines, epoxides and acyl lactams.

12. Polymer composition according to claim 11, characterized in that the reactive groups are amino groups, hydroxyl groups, aldehyde groups, keto groups or thiol groups.

13. Coloured polyamide composition with improved color fastness, said composition comprising polyamide and one or more organic colorants, wherein the polyamide has an amino end group content of less than 20 meq/kg and the colorfastness of said composition, expressed as $\Delta E^*_{ab}$, is not more than 2.4.

14. The composition of claim 13 wherein the amino end group content is less than 10 meq/kg.

15. The composition of claim 14 wherein the amino end group content is less than 5 meq/kg.

16. Object molded from a polymer composition according to any one of the claims 2–4, 1 or 11–15.

* * * * *